United States Patent
Boilard et al.

(10) Patent No.: US 10,162,383 B2
(45) Date of Patent: Dec. 25, 2018

(54) ELECTRONIC DEVICE WITH BRACE FOR EDGE-TO-EDGE OPENING

(71) Applicant: GOOGLE INC., Mountain View, CA (US)

(72) Inventors: Joshua Boilard, San Francisco, CA (US); Amy Lai Wong, San Francisco, CA (US); Kelvin Kwong, San Jose, CA (US); James Cooper, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/465,125

(22) Filed: Mar. 21, 2017

(65) Prior Publication Data
US 2018/0275720 A1    Sep. 27, 2018

(51) Int. Cl.
| | | |
|---|---|---|
| *G06F 1/16* | (2006.01) | |
| *H05K 5/00* | (2006.01) | |
| *H05K 7/00* | (2006.01) | |
| *G06K 9/00* | (2006.01) | |

(52) U.S. Cl.
CPC .......... *G06F 1/1633* (2013.01); *G06F 1/1616* (2013.01); *G06K 9/00006* (2013.01)

(58) Field of Classification Search
CPC .... G06F 1/1633; G06F 1/1616; G06F 1/1656; G06F 1/1658; G06F 1/1684
USPC ............... 361/679.21–679.3, 679.55, 679.56
See application file for complete search history.

(56) References Cited

U.S. PATENT DOCUMENTS

| | | | | |
|---|---|---|---|---|
| 5,515,237 A | * | 5/1996 | Ogami ................ | G06F 1/1616 361/679.37 |
| 5,886,869 A | | 3/1999 | Fussell et al. | |
| 6,483,466 B2 | | 11/2002 | Liu | |
| 6,549,756 B1 | * | 4/2003 | Engstrom .......... | A61B 5/02438 455/100 |
| 7,466,542 B2 | * | 12/2008 | Kuo .................... | G06F 1/1616 345/520 |
| 7,515,431 B1 | * | 4/2009 | Zadesky ............ | H04M 1/0202 361/616 |
| 7,789,437 B2 | * | 9/2010 | Sheng ................. | G06F 1/1658 292/137 |
| 8,094,443 B2 | * | 1/2012 | Yamaguchi ........ | G06F 1/162 361/679.21 |

(Continued)

FOREIGN PATENT DOCUMENTS

| | | |
|---|---|---|
| EP | 2506111 A2 | 10/2012 |
| WO | 2010027565 A2 | 3/2010 |

OTHER PUBLICATIONS

International Search Report and Written Opinion for International Application PCT/US2017/058432, dated Feb. 8, 2018, 12 pages.

*Primary Examiner* — Anthony Haughton
(74) *Attorney, Agent, or Firm* — Brake Hughes Bellermann LLP

(57) ABSTRACT

An electronic device includes: an enclosure having a first surface, a second surface, and a side surface disposed between the first and second surfaces; an edge-to-edge component mounted in an edge-to-edge opening that extends across substantially an entire width of the side surface between the first surface and the second surface; and a brace disposed in the enclosure, the brace extending along the edge-to-edge opening.

21 Claims, 13 Drawing Sheets

(56) References Cited

U.S. PATENT DOCUMENTS

| | | | |
|---|---|---|---|
| 8,214,549 B2 * | 7/2012 | Dicks | A61B 5/0022 |
| | | | 710/15 |
| 8,391,000 B2 * | 3/2013 | Saito | G06F 1/1616 |
| | | | 361/679.01 |
| 9,282,659 B2 * | 3/2016 | Lee | H05K 5/0221 |
| 9,529,392 B2 * | 12/2016 | Lee | G06F 1/1656 |
| 2005/0023022 A1 | 2/2005 | Kriege et al. | |
| 2009/0153412 A1 | 6/2009 | Chiang et al. | |
| 2010/0232122 A1 * | 9/2010 | Chen | H04M 1/236 |
| | | | 361/752 |
| 2011/0006953 A1 | 1/2011 | Chiang et al. | |
| 2013/0216067 A1 | 8/2013 | McClure et al. | |
| 2013/0235538 A1 | 9/2013 | Hashimoto et al. | |
| 2013/0329450 A1 | 12/2013 | Degner et al. | |
| 2014/0111929 A1 | 4/2014 | Andre et al. | |
| 2014/0361932 A1 | 12/2014 | Irci et al. | |
| 2015/0071509 A1 | 3/2015 | Myers | |
| 2016/0204502 A1 | 7/2016 | Misra et al. | |
| 2016/0363961 A1 | 12/2016 | McClure et al. | |

* cited by examiner

US 10,162,383 B2

ELECTRONIC DEVICE WITH BRACE FOR EDGE-TO-EDGE OPENING

TECHNICAL FIELD

This document relates, generally, to an electronic device having a brace for an edge-to-edge opening in the electronic device.

BACKGROUND

In parallel with the development of thinner and smaller components for electronic devices, such as processors, memories and displays, efforts have also been made to make the devices themselves less bulky.

SUMMARY

In a first aspect, an electronic device includes: an enclosure having a first surface, a second surface, and a side surface disposed between the first and second surfaces; an edge-to-edge component mounted in an edge-to-edge opening that extends across substantially an entire height of the side surface between the first surface and the second surface; and a brace disposed in the enclosure, the brace extending along the edge-to-edge opening.

Implementations can include any or all of the following features. The edge-to-edge component includes a fingerprint sensor device for the electronic device. The fingerprint sensor device is configured to operate without a grounding ring being part of the edge-to-edge component. A fingerprint sensor of the fingerprint sensor device is covered by a coating, and wherein the enclosure includes metal. The edge-to-edge component includes a power button for the electronic device, the power button having a direction of travel directed through the edge-to-edge opening. The brace serves as a bottoming-out structure for the power button. The electronic device further includes at least one biasing element mounted between the brace and the power button. The brace comprises a longitudinal member having a length, wherein in at least part of the length the longitudinal member has an L-shaped profile The electronic device further includes a flex conductor connected to the edge-to-edge component, the flex conductor extending along the brace. The flex conductor extending along the brace includes a first fold of the flex conductor at an angle of about 45 degrees. The flex conductor further includes a second fold of the flex conductor at an angle of about 90 degrees, and the flex conductor extends toward the edge-to-edge component through an opening or recess in the brace. The electronic device further includes a cosmetic component supported by the brace.

Implementations can include any or all of the following features. The electronic device further includes an enclosure portion extending along the first surface of the enclosure, wherein the cosmetic component is positioned on the enclosure portion, wherein the enclosure portion terminates before the side surface adjacent the edge-to-edge opening, and wherein the brace supports the cosmetic component between an edge of the enclosure portion and the side surface. The enclosure includes at least a first enclosure having the first surface thereon, and a second enclosure having the second surface thereon, the first enclosure having a curved undercut forming the side surface, the electronic device further comprising a support component configured to bridge between the second enclosure and the side surface, the support component having a curved hook configured to extend into the curved undercut so as to secure the support component in position. The support component comprises a stamped piece and wherein the curved hook is a section of the stamped piece folded so as to be essentially perpendicular to a remainder of the stamped piece. The enclosure comprises a base and a lid hinged to each other, the lid having a display and the base having a keyboard, wherein the electronic device can be moved to at least a first folded configuration in which the display is adjacent the keyboard, and a second folded configuration in which a back of the lid is adjacent a back of the base. The electronic device further includes an antenna for the electronic device, the antenna mounted inside the lid. The electronic device further includes an antenna window formed in the base, the antenna window essentially free from metal and configured to allow passage of signals to and from the antenna at least when the electronic device is in the second folded configuration. The antenna window comprises an opening in a surface of the enclosure in the base, and wherein the brace is positioned adjacent the opening. The edge-to-edge opening extends into at least one of the first and second surfaces.

In a second aspect, an electronic device includes: an enclosure having a first surface, a second surface, and a side surface disposed between the first and second surfaces; an edge-to-edge component mounted in an edge-to-edge opening that extends across substantially an entire height of the side surface between the first surface and the second surface; and means inside the enclosure, for extending along the edge-to-edge opening and strengthening and stiffening the enclosure at the edge-to-edge opening.

BRIEF DESCRIPTION OF DRAWINGS

Like reference symbols in the various drawings indicate like elements.

DETAILED DESCRIPTION

This document describes examples of increasing the strength and/or stiffness of an electronic device. In some implementations, a hinged electronic device such as a laptop can have an edge-to-edge component mounted in an opening in a side surface of the device. The device can have a brace inside its enclosure to strengthen and stiffen the enclosure in the area of the opening. Strength and/or stiffness can be increased by providing a support component that is hooked onto a curved undercut of the enclosure. Wireless communication can be increased by providing a pathway for signals through a body of an electronic device.

An electronic device that is thinner can be considered commercially advantageous over other devices if it is lighter, looks more appealing, and/or is easier to hold and manipulate in one's hands. With a device such as a laptop computer, however, the process of designing a thinner device can present certain challenges. Generally, a device can include a relatively strong and stiff enclosure that protects the interior electronic components (e.g., the processor(s) and display) in case of the device being dropped. However, when certain components of the device should be mounted so that they face outward this requires the enclosure to have at least one opening therein, which can reduce the stiffness and strength of the enclosure. Other design aspects of a thinner electronic device can also affect strength and stiffness.

Figure 1A:
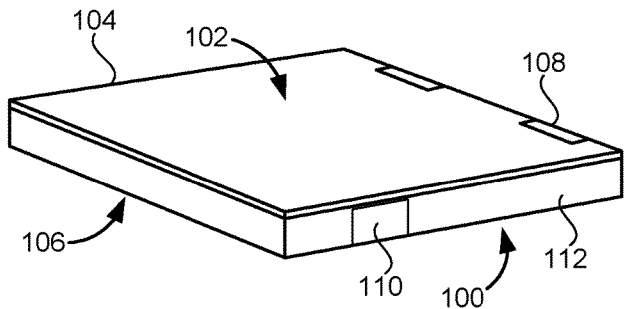
FIGS. 1A-C shows an example of an electronic device having multiple configurations.
Figure 1B:
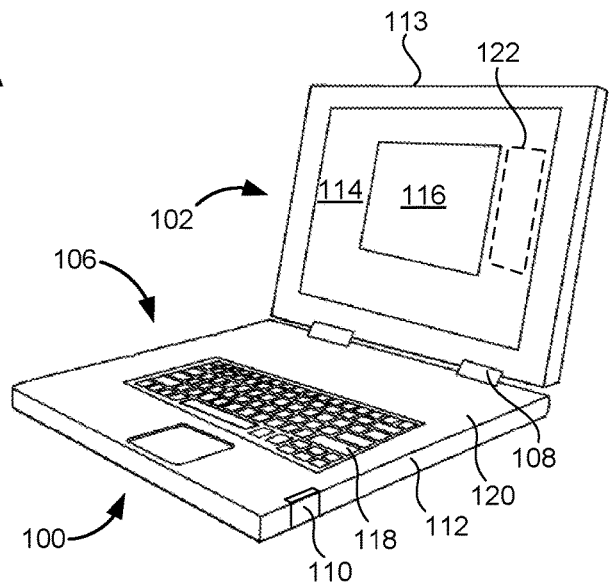
Figure 1C:
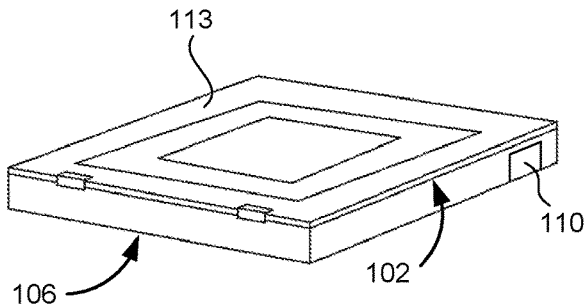

FIGS. 1A-C shows an example of an electronic device 100 having multiple configurations. In some implementations, the electronic device 100 is a laptop device configured to present a display arranged at an adjustable angle relative to a keyboard on the device. For example, the electronic device 100 can include some or all components of the devices described below with reference to FIG. 11.

The electronic device can have two or more body portions, including, but not limited to, a lid and/or a base. FIG. 1A shows that the electronic device 100 includes a lid 102 having at least a main outer surface 104, and a main inner face that is not visible in this view. The electronic device 100 here also includes a base 106 having at least main inner and outer surfaces, neither of which is visible in this view.

The electronic device 100 can have one or more hinges connecting the lid 102 and the base 106 to each other. Here, two hinges 108 are shown as an example. The hinge(s) 108 can be separately formed and attached to the lid 102 and the base 106, or can be formed as an integral part of either or both of the lid 102 and base 106. The hinge(s) 108 allows the lid 102 and the base 106 to be rotated relative each other into multiple configurations. Here, the lid 102 has been positioned so that a display on the lid (not shown) is covered by the base 106. This folded configuration can be considered a closed laptop mode of the electronic device 100.

One or more edge-to-edge components 110 can be provided on the electronic device 100. The edge-to-edge component 110 can extend from one edge to another on the lid 102 and/or the base 106, to name just two examples. Here, the edge-to-edge component 110 covers a portion of a side surface 112 of the base 106. The side surface extends along a perimeter of the electronic device 100 and connects its main outer and inner surface to each other.

FIG. 1B shows that the lid 102 and the base 106 of the electronic device 100 have been rotated relative to each other compared to FIG. 1. A main inner surface 113 of the lid 102 is currently visible, and here includes a display 114 on which an image 116 is currently presented. The base 106 has a keyboard area 118, for example including one or more of a full QWERTY keyboard, a numerical keypad, control keys, a pointing stick and/or a track pad. The keyboard area 118 is here located on a main inner surface 120 of the base 106. The edge-to-edge component 110 here extends across the side surface 112. In some implementations, the edge-to-edge component 110 can extend onto one or more other surfaces of the electronic device 100. For example, the edge-to-edge component 110 here also extends onto the main inner surface 120 of the base 106. As another example, the edge-to-edge component 110 can also or instead extend onto a main outer surface (not visible in this view) of the base 106. As another example, the edge-to-edge component 110 can extend from the main inner surface 120 to the main outer surface. Multiple edge-to-edge components (e.g., the edge-to-edge component 110) can be mounted on an electronic device (e.g., the electronic device 100). For example, when the electronic device 100 has multiple side surfaces 112 (e.g., respective front, side and back surfaces 112) a respective one of the edge-to-edge component 110 can be placed mounted to each of two or more of such side surfaces 112.

The electronic device 100 can include one or more antennas. An antenna can be used for communication of any suitable type of signal, including, but not limited to, a wifi signal. An antenna can be placed in the lid 102 and/or in the base 106. In some implementations, an antenna 122 can be placed in the lid 102. For example, the antenna 122 can be placed entirely or partially behind the display 114.

In this configuration, the user can view the display 114 and can use the keyboard area 118. This folded configuration can be considered an open laptop mode of the electronic device 100. The electronic device 100 can be moveable between multiple configurations by way of the hinged connection between the lid 102 and the base 106. For example, the electronic device 100 can be continuously moveable to any of such configurations.

FIG. 1C shows that the lid 102 and the base 106 of the electronic device 100 can be rotated relative to each other so that the main inner surface 113 of the lid 102 is facing outward (e.g., upward, in some situations), with the base 106 being positioned underneath the lid 102 in this configuration. This folded configuration can be considered a tablet mode of the electronic device 100.

The above example illustrates that the electronic device 100 can have the lid 102 with the main outer surface 104 and the main inner surface 113, and that the base 106 can have its respective main inner and outer surfaces. The base 106 and the lid 102 can be hinged to each other for the electronic device 100 to assume at least the closed laptop mode (FIG. 1A), where the main inner surface 113 of the lid 102 is adjacent the main inner surface of the base 106 (e.g., the display 114 can be adjacent the keyboard area 118), and the tablet mode (FIG. 1C) where the main outer surface 104 of the lid 102 is adjacent the main outer surface of the base 106 (e.g., a back of the lid 102 can be adjacent a back of the base 106).

Figure 2:
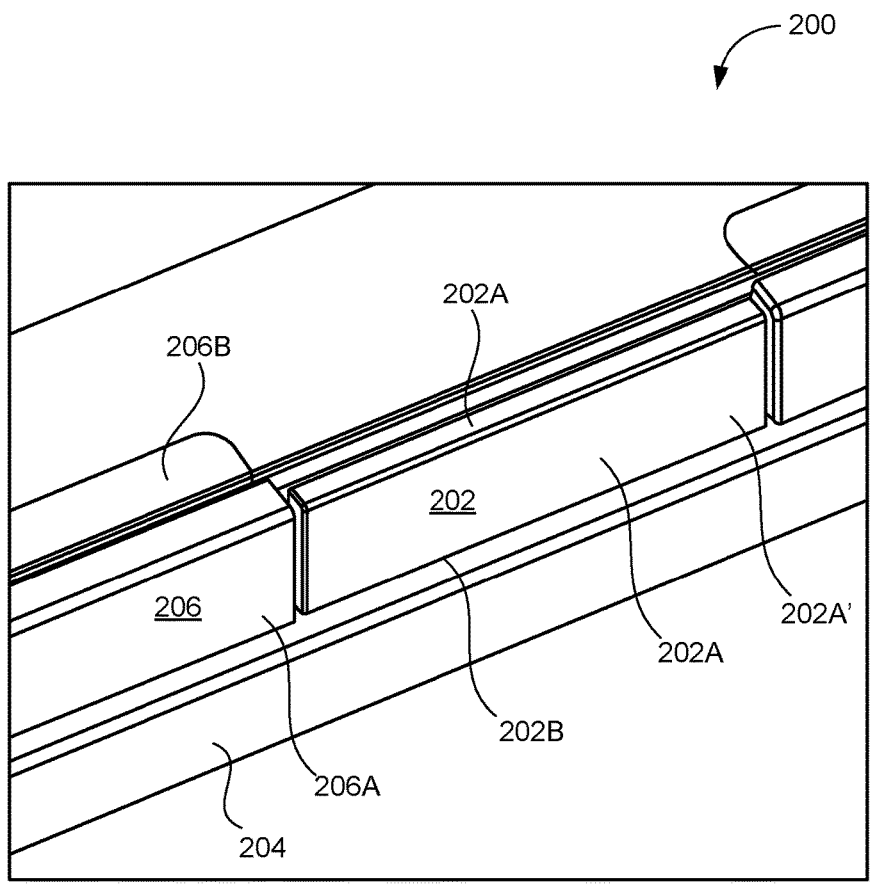
FIG. 2 shows an example of an electronic device having an edge-to-edge component.

FIG. 2 shows an example of an electronic device 200 having an edge-to-edge component 202. For clarity, only a portion of the electronic device 200 is shown. The electronic device 200 can be a hinged laptop device having a lid 204 and a base 206 hinged to each other. In this illustration, the electronic device 200 has been folded so that the base 206 is currently facing upward, for illustrative purposes, and the lid 204 is positioned under the base 206.

The edge-to-edge component 202 can be any suitable component for the electronic device. In some implementations, the edge-to-edge component includes an output device. For example, audio and/or video output can be generated. In some implementations, the edge-to-edge component 202 includes an input component. For example, input can be generated into the electronic device 200 based on user action and/or the ambient surrounding of the electronic device 200. Here, the edge-to-edge component 202 includes a fingerprint sensor device for the electronic device 200. For example, a user whose fingerprint has previously been registered can use the fingerprint sensing device to issue one or more commands to the electronic device 200.

The edge-to-edge component 202 in this example looks like a button on a side surface of the electronic device 200. The edge-to-edge component 202 can be mounted in a corresponding edge-to-edge opening in the base 206. Here, the base 206 has a side surface 206A disposed between a surface 206B (e.g., a bottom surface) and a corresponding top surface (not shown) thereof. The edge-to-edge opening can extend across substantially an entire height of the side surface 206A between the surface 206B and the corresponding top surface. The edge-to-edge component 202 can extend across the side surface 206A. The edge-to-edge component 202 can also extend onto one or more other surfaces of the base 206. For example, here the edge-to-edge component 202 extends onto the surface 206B of the base 206. As such, the user can see the edge-to-edge component 202 also when viewing the electronic device 200 in a direction perpendicular to the surface 206B (e.g., when viewing the electronic device 200 from the bottom). This can be advantageous, for example with a device having different folded configurations where the device is sometimes used with the keyboard facing away from the user (e.g., facing down, as the case may be in a tablet mode), or facing toward the user (e.g., facing upward, as the case may be in a laptop open mode). In some implementations, the electronic device 200 is a laptop device that is designed to have a very thin profile. For example, the enclosure of the electronic device 200 may then be about 5 mm thick. If the edge-to-edge component 202 should fit on the electronic device 200 without increasing an overall size defined by, say, the base 206, then the edge-to-edge component 202 must also be relatively small and have a slim profile.

The edge-to-edge component 202 can provide an exterior surface 202A for use in operation of the edge-to-edge component 202. When the edge-to-edge component 202 includes a fingerprint sensor device, the exterior surface 202A can be provided on a fingerprint sensor of such a device. For example, the user can place their finger on, or swipe the finger along, the exterior surface 202A in order to have the edge-to-edge component 202 make a reading of the user's fingerprint.

Here, the edge-to-edge component 202 has exposed edges 202A and 202B. For example, the exposed edge 202A of the edge-to-edge component 202 at the surface 206B of the base 206 is visible. Similarly, the other exposed edge 202B of the edge-to-edge component 202 (e.g., an opposite edge) is currently not visible due to the position of the lid 204, but can be visible from another direction. Traditionally, some components such as fingerprint sensor devices are provided with a grounding ring that is electrically connected to ground and configured to provide a ground potential for the operation of the component. The term "ring" can signify that such an element surrounds (e.g., frames) an active area of the component (e.g., the sensing area of a fingerprint sensor device) but does not necessarily mean that the element is circular. Rather, a grounding ring can have another shape, such as rectangular. However, no grounding ring or other specific grounding structure is part of the edge-to-edge component 202. For example, if the surface 206A had a relatively thick coating (e.g., orders of magnitude thicker than a few microns) then a grounding ring may have been preferable. In some implementations, however, the exterior surface 202A has a coating 202A' (e.g., a film) that is very thin. For example, the coating 202A' can be on the order of a few microns thick. In such implementations, the active area of the edge-to-edge component 202 (e.g., the active area of a fingerprint sensor) can be closer to the user's finger touching the surface 202A. As such, the edge-to-edge component 202 can be configured to operate without a grounding ring being part of the edge-to-edge component 202. For example, the enclosure of the base 206 and/or the lid 204 can be made of metal (including, but not limited to, an aluminum alloy).

Figure 3A:
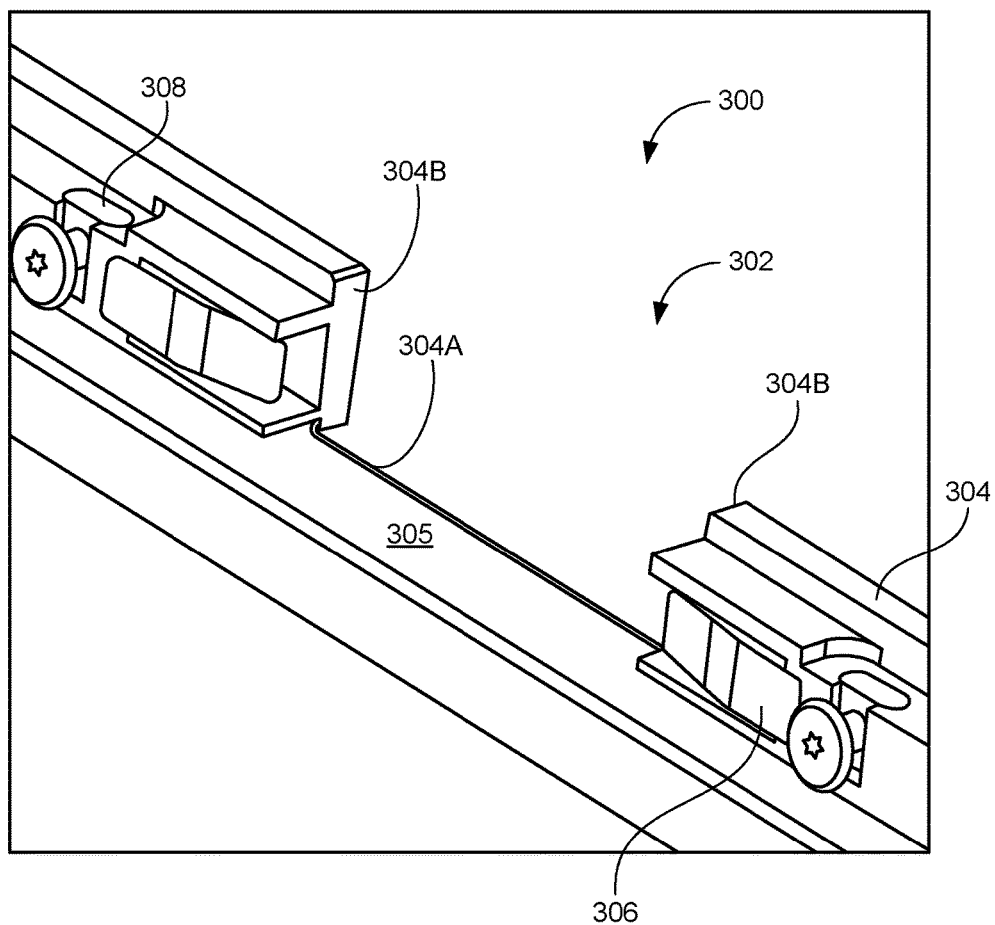
FIGS. 3A-B show examples of an electronic device having an edge-to-edge opening in an enclosure.
Figure 3B:
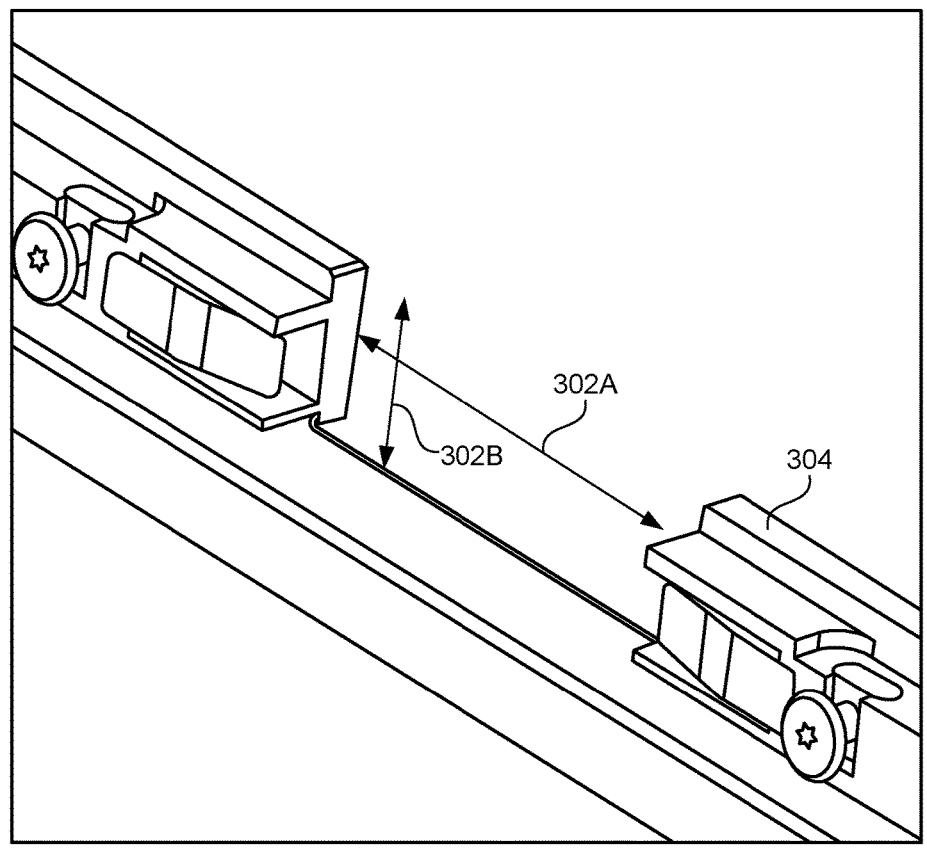

FIG. 3A shows an example of an electronic device 300 having an edge-to-edge opening 302 in an enclosure 304. For clarity, only a portion of the enclosure 304 is shown, and interior circuitry and components of the electronic device have been omitted. The enclosure 304 can provide the enclosing structure for a portion of a laptop device, such as a base thereof. The enclosure 304 can define the edge-to-edge opening 302 by way of one or more features. For example, here an edge 304A and respective opposing edges 304B are part of defining the edge-to-edge opening 302. For example, the edge 304A is formed at the end of a planar bottom surface 305 of the enclosure 304. The edge 304A is set back some distance from an outer periphery of the enclosure 304. This can allow an edge-to-edge component (not shown) mounted in the edge-to-edge opening 302 to have one or more of its edges exposed. The edge-to-edge opening 302 creates a gap in the enclosure 304, the gap here indicated by arrows 302A and 302B as shown in FIG. 3B. The height of the edge-to-edge opening 302, here indicated by the arrow 302B, can extend across substantially an entire height of the surface in which it is formed. For example, the edge-to-edge opening can extend across about 90% of the height of the thickness of the enclosure 304. As another example, the edge-to-edge opening 302 can extend into at least one adjacent surface (e.g., in FIG. 1B, the edge-to-edge opening of the edge-to-edge component 110 extends onto the main inner surface 120 of the base 106). The gap indicated by the arrows 302A-B is formed in the enclosure 304 which can be the largest part of the electronic device 300 and can serve to provide strength and stiffness to reduce the risk of damage to the circuitry and other sensitive components.

The gap created by the edge-to-edge opening 302, and indicated by arrows 302A-B, can make it preferable to add some additional structure (e.g., brace, etc.) in the electronic device so as to compensate. However, increasing the structure can be challenging to do, especially if the electronic device 300 has a narrow profile (e.g., is very thin). However, examples of approaches that can be used are described herein. One or more biasing elements 306 (e.g., a spring or other flexible element) can be provided adjacent the edge-to-edge opening 302 to facilitate the placement and/or operation of an edge-to-edge component in the edge-to-edge opening 302. Here, the biasing elements 306 are placed on both sides of the edge-to-edge opening 302. One or more fastening devices 308 (e.g., vertically inserted press nuts) can be provided adjacent the edge-to-edge opening 302 to facilitate the placement and/or operation of an edge-to-edge component in the edge-to-edge opening 302. Here, at least one fastening device 308 is provided on each side of the edge-to-edge opening 302.

Figure 4:
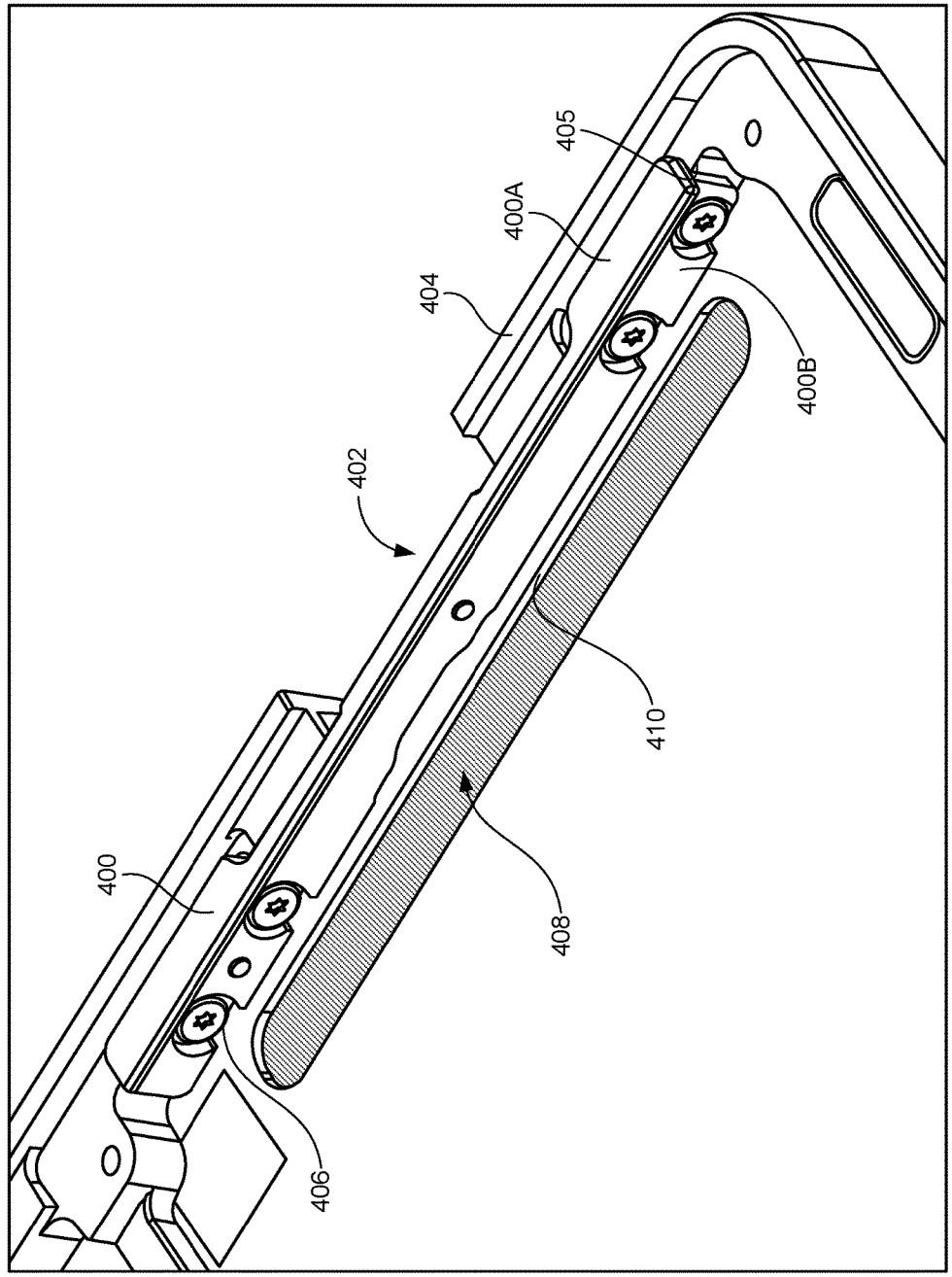
FIG. 4 shows an example of a brace extending along an edge-to-edge opening.

FIG. 4 shows an example of a brace 400 extending along an edge-to-edge opening 402. Here, the brace 400 covers the width of the edge-to-edge opening 402 and also extends beyond the edge-to-edge opening on each side thereof. The edge-to-edge opening 402 is provided in an enclosure 404, such as in a base of a laptop device. The brace 400 serves to add structure to the enclosure 404 at the edge-to-edge opening 402. The brace 400 can have at least a face 400A directed away from a bottom of the enclosure 404, and a face 400B directed away from the edge-to-edge opening of the enclosure 404. The brace 400 can have a cross section that is essentially L-shaped over all or at least part of its length (e.g., L-shaped cross-sectional profile if cut along a plane perpendicular to an axis aligned along the longitudinal member). Such an L-shaped profile can be defined within the brace, for example, between two of the bolts illustrated in FIG. 4. In some implementations, such an L-shaped profile may not be defined within, for example, a middle portion of the brace adjacent the edge-to-edge opening 402. For example, the face 400A can be formed on structure that corresponds to one axis of the L-shape, and the face 400B can be formed on structure that corresponds to another axis of the L-shape. For example, the L-shape can allow the brace to be fit against an edge 405 of the enclosure 404. The brace 400 can facilitate the installation and/or operation of at least one edge-to-edge component (not shown) mounted in the edge-to-edge opening 402. The brace 400 can serve as a support structure for one or more components (not shown) in the enclosure 404. The brace 400 can be attached to the enclosure 404 by way of either or both of the faces 400A-B, or in another way. One or more fastening devices 406 (e.g., bolts) can be used for attaching the brace 400. Here, the brace 400 is attached to the enclosure 404 by four fastening devices 406 (e.g., bolts). The brace can include any suitable material that allows it to extend along the edge-to-edge opening 402 and strengthen and stiffen the enclosure 404 at the edge-to-edge opening 402, including, but not limited to, a metal, for example aluminum.

An electronic device of which the enclosure 404 (which can be a base enclosure) is part can have one or more antennas (not shown). The antenna(s) can be mounted on the enclosure 404 and/or on another portion of the electronic device (e.g., on a lid thereof). The operation of the antenna can be improved by providing one or more windows in the enclosure 404. Here, an antenna window 408 is provided in the enclosure 404. Specifically, providing the antenna window 408 in the enclosure 404 can allow passage of signals to or from such antenna through the body of the enclosure 404. For example, the antenna window 408 can be formed by an opening 410 in the material of a surface of the enclosure 404, the antenna window 408 being free of metal and/or other material that interferes with the signal(s). The brace 400 can serve to strengthen and/or stiffen the enclosure 404 with regard to the presence of the antenna window 408. For example, the antenna window 408 can be placed adjacent the brace 400.

An implementation of the antenna window 408 is described here with reference again to FIGS. 1A-C. When the electronic device 100 is in the tablet mode (FIG. 1C), the antenna 122 disposed within the enclosure of the lid 102 can be positioned adjacent the base 106. The antenna 122 is then positioned between the display 114 and the base 106. Providing an antenna window in the enclosure of the base 106 (e.g., antenna window 408 in the enclosure 404) can allow passage of signals to or from such antenna in the lid 102 through the body of the base 106, such as when the electronic device is in a tablet mode. In such a configuration, signals from the antenna may not be inhibited when the electronic device is in the laptop mode.

As such, the above examples in FIGS. 1-4 illustrate that the electronic device (e.g., 100, 200, 300) can have an enclosure (e.g., 304 or 404) with respective first and second surfaces (e.g., 206B), and with a side surface (e.g., 112) that connects these surfaces (e.g., 206B) with each other. The electronic device (e.g., 100, 200, 300) can have an edge-to-edge component (e.g., 110, 202) mounted in an edge-to-edge opening (e.g., 302, 402) of the side surface (e.g., 112). The electronic device (e.g., 100, 200, 300) can have a brace (e.g., 400) inside the enclosure (e.g., 304 or 404), the brace extending along the edge-to-edge opening (e.g., 302, 402). As such the examples illustrate that the brace (e.g., 400) can serve for extending along the edge-to-edge opening (e.g., 302, 402) and for strengthening and stiffening the enclosure (e.g., 304 or 404) at the edge-to-edge opening (e.g., 302, 402).

Figure 5:
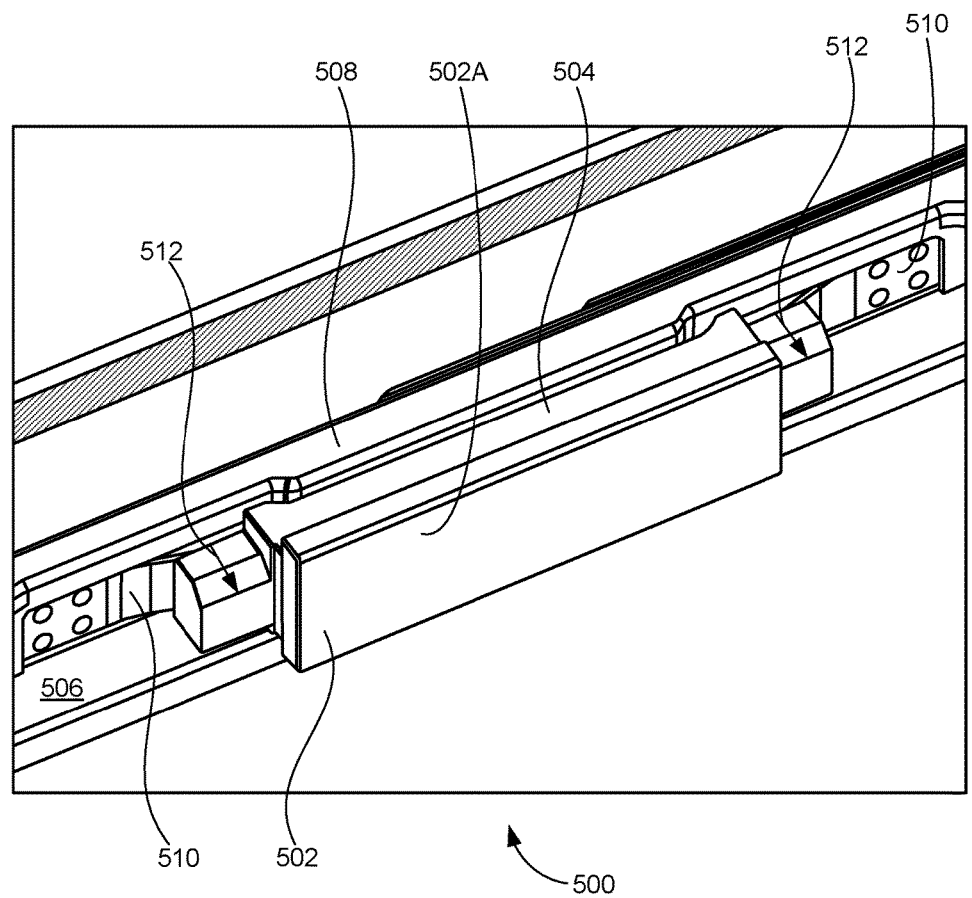
FIG. 5 shows an example of an edge-to-edge component including a fingerprint sensor device and a power button.

An edge-to-edge component can provide one or more functions to an electronic device. FIG. 5 shows an example of an edge-to-edge component 500 including a fingerprint sensor device 502 and a power button 504. The edge-to-edge component 500 is here mounted in an enclosure 506 (e.g., a base) of an electronic device. The remainder of the electronic device, and some portions of the enclosure 506, are not shown for clarity. For example, the enclosure 506 can include structure that defines an edge-to-edge opening in which the edge-to-edge component 500 can be mounted. The edge-to-edge component 500 can span substantially the same opening distance as the edge-to-edge opening. In some implementations, the thickness of the edge-to-edge component 500 can be slightly taller (e.g., about 10% taller) than the height of the edge-to-edge opening. In some implementations, the edge-to-edge component 500 can be slightly shorter (e.g., about 10% shorter) than the height of the edge-to-edge opening. A brace 508 can be mounted so that it extends along such an edge-to-edge opening, and the brace can strengthen and stiffen the enclosure 506.

The fingerprint sensor device 502 can include a fingerprint sensor 502A, such as an imaging component configured to detect a pattern of a user's finger placed on the fingerprint sensor device. The power button 504 can be configured for turning on and off power of the electronic device. In some implementations, the power button 504 has a direction of travel when pressed by the user. The direction of travel can be directed through the edge-to-edge opening in which the edge-to-edge component 500 is mounted. For example, the user presses inward on the fingerprint sensor device 502 to activate the power button 504. Any type of power button can be used. For example, the power button 504 can include a dome switch. The brace 508 can serve as a bottoming-out structure for the power button 504. For example, when the fingerprint sensor device 502 moves in its direction of travel as a result of a user pressing on the edge-to-edge component 500, the brace 508 can provide a stop for the movement.

The edge-to-edge component 500 can have a certain amount of wobble when mounted to the enclosure 506. The enclosure 506 can be provided with one or more biasing elements 510. For example, here one of the biasing elements 510 is provided on each side of the edge-to-edge component 500. The biasing elements 510 can be provided between the edge-to-edge component 500 and the brace 508, or between the edge-to-edge component 500 and another structure, such as the enclosure 506. For example, the biasing elements 510 can be provided between the power button 504 and the brace 508. The biasing elements 510 can add preload to the edge-to-edge component 500 as indicated by arrows 512. The preload is here perpendicular to the edge-to-edge opening and directed outward from the enclosure 506. For example, such preload can be in addition to any preload provided by the power button 504 (e.g., by a dome switch).

This can stabilize the edge-to-edge component 500 and/or improve the overall feel thereof.

The above examples illustrate that the brace 508 can serve for extending along the edge-to-edge opening in which the edge-to-edge component 500 is mounted, and for strengthening and stiffening the enclosure 506 at the edge-to-edge opening.

Figure 6:
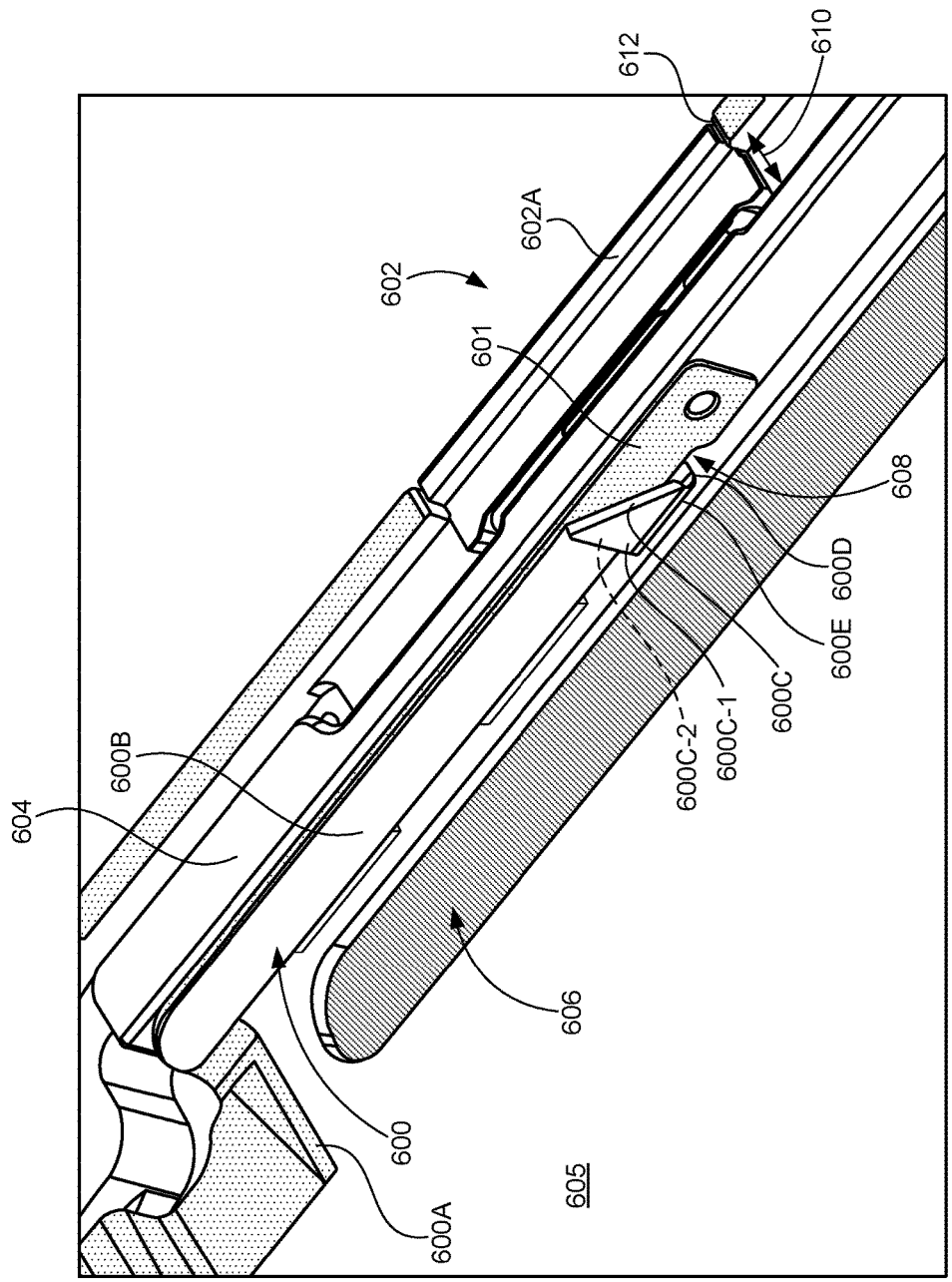
FIG. 6 shows an example of a flex conductor for an edge-to-edge component.

FIG. 6 shows an example of a flex conductor 600 for an edge-to-edge component 602. The flex conductor contains one or more conductors that connect the edge-to-edge component 602 to circuitry or to another component in the electronic device. For example, the flex conductor 600 can include a flat band of conductors. The flex conductor 600 is here placed aligned along a brace 604 that extends along an edge-to-edge opening in which the edge-to-edge component 602 is mounted. The flex conductor 600 includes a circuit portion 600A that is positioned toward the circuitry or other components inside the electronic device that are in communication with the edge-to-edge component 602. The flex conductor 600 includes a portion 600B that here extends along the brace 604. For example, positioning the portion 600B perpendicular to a bottom surface 605 of the enclosure can facilitate the placement of an antenna window 606 in the enclosure. The flex conductor 600 includes a fold 600C where the flex conductor 600 changes direction so as to extend toward the edge-to-edge component 602. The flex conductor 600 includes a portion 600D that extends toward the edge-to-edge component 602. The portion 600D can extend toward the edge-to-edge component 602 through an opening 608 (or recess) in the brace 604. In some implementations, a stiffener member 601 can be provided for the flex conductor 600. The stiffener member 601 can be disposed on at least one side of the flex conductor 600. The stiffener member 601 is here disposed between the portion 600B of the flex conductor 600 and the brace 604. The stiffener member 601 can be made from metal, such as from steel, or from another material having a required stiffness.

For example, it may not be possible or desirable to lay the flex conductor 600 flat against the bottom surface 605 of the enclosure near the brace 604 due to the presence of the antenna window 606. However, if the flex conductor is not laid flat against the bottom surface 605, it may then not be feasible to use an L-shape in the flex conductor 600 to make the turn towards the edge-to-edge component 602. Therefore, the portion 600B can be used to allow the flex conductor 600 to extend along the brace 604. Rather, the fold 600C can provide the required change in direction of the flex conductor 600. For example, the flex conductor can be folded over on itself at an angle of about, for example, 45 degrees at the end of the portion 600B, so as to create the fold 600C. The fold 600C here forms a portion 600C-1 on one side of the fold 600C, and a corresponding portion 600C-2 (adjacent the portion 600C-1) on the other side of the fold 600C. The portions 600C-1 and 600C-2 are here adjacent each other, with the portion 600C-1 being disposed further from the brace 604 than the portion 600C-2 is disposed from the brace 604. The portion 600D of the flex conductor 600, can be folded in a fold 600E of about, for example, 90 degrees so as to pass through the opening 608 (or recess) in the brace 604 and therefore extend toward the edge-to-edge component 602.

The flex conductor 600 can also facilitate a visually appealing design of the electronic device. The edge-to-edge component 602 can be configured so as to have a certain amount of travel in the direction through an edge-to-edge opening in which the edge-to-edge component 602 is mounted. For example, when the edge-to-edge component 602 travels inward, a gap 610 can appear between an edge 602A of the edge-to-edge component 602 and an edge 612 of the enclosure. In particular, because of the edge-to-edge design of the edge-to-edge component 602, a user may be able to see partially into the electronic device at the gap 610 when the edge-to-edge component 602 is pressed inward. The flex conductor 600 can therefore be hidden from the user's view by way of the solution where the portion 600D passes through the opening 608 in the brace 604, which in turn, can be facilitated by the folds 600C and 600E allowing the flex conductor 600 to turn between the portion 600B and the portion 600D.

The above examples illustrate that the brace 604 can serve for extending along the edge-to-edge opening in which the edge-to-edge component 602 is mounted, and for strengthening and stiffening the enclosure at the edge-to-edge opening.

Figure 7:
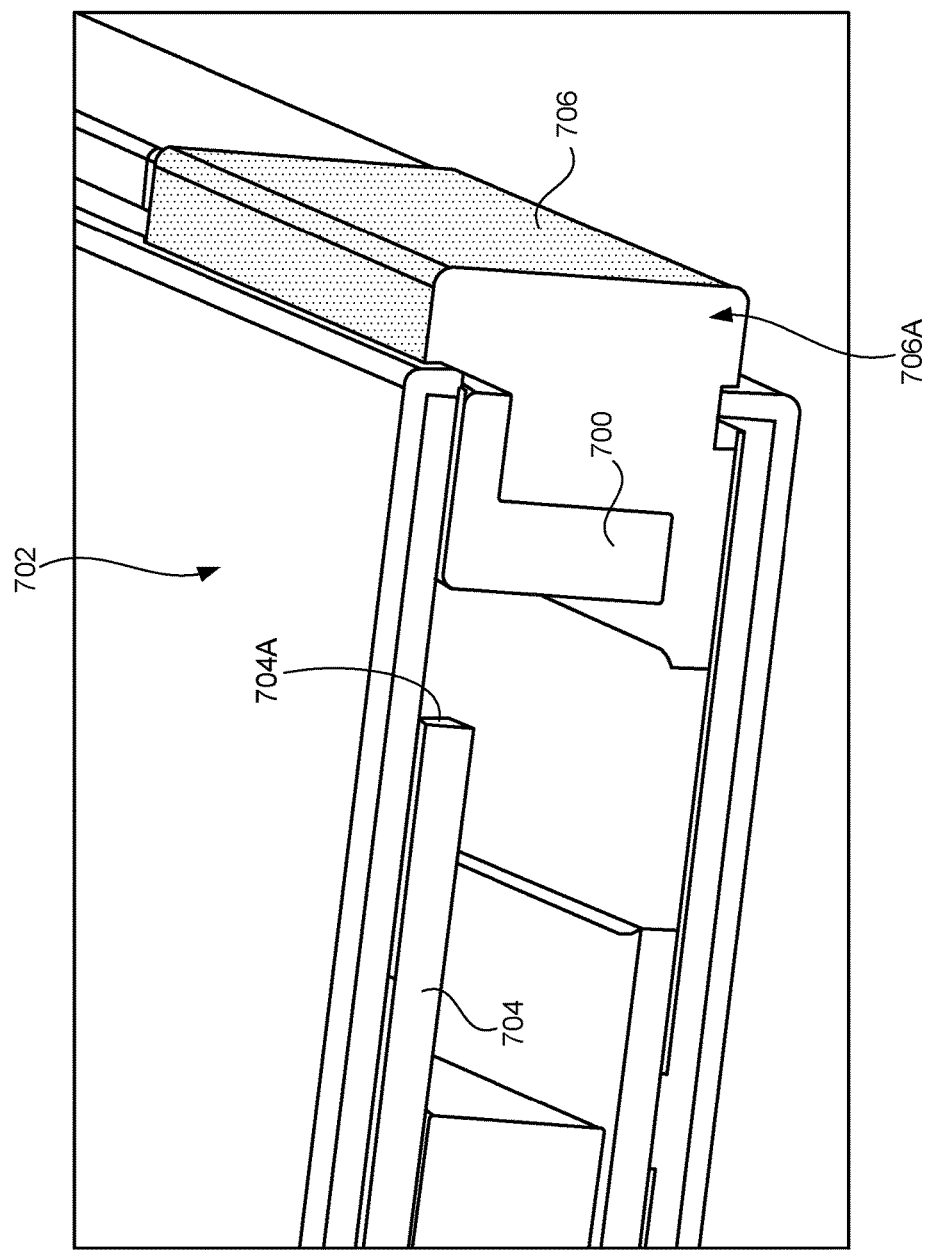
FIG. 7 shows an example of a brace supporting a cosmetic component between an edge of an enclosure portion and a side surface.

FIG. 7 shows an example of a brace 700 supporting a cosmetic component 702 between an edge 704A of an enclosure portion 704 and a side surface 706. This illustration is a cross section of an electronic device having an enclosure 706A. The cosmetic component 702 in some implementations can be considered a foot of the electronic device. For example, the cosmetic component can include one or more layers. The cosmetic component 702 here is disposed on top of (or in contact with) the brace 700. For example, the cosmetic component 702 and the brace 700 can be attached to each other, such as by an adhesive. In other areas, the cosmetic component 702 can be disposed atop (or in contact with) the enclosure 704 and/or the enclosure 706A. The enclosure 704 can be considered part of a so-called D side of the enclosure of the electronic device. For example, a device can have respective sides of the base and lid enclosures identified as A-D as follows: the A side of the lid enclosure can be the outside of the lid enclosure; the B side of the lid enclosure can be an inside bezel of the lid enclosure; the C side of the base enclosure can be a top portion or surface of a base enclosure; and the D side of the base enclosure can be the bottom surface (e.g., metal surface) of the base enclosure.

In theory, it may be preferable to have every part of the cosmetic component 702 to be disposed on the D enclosure, so as to improve on any stepping gap between the D enclosure and other structure, and to provide a continuous surface for the adhesion of the cosmetic component 702 to the D enclosure. However, such an approach may not be possible or feasible. For example, it may not be possible to fit each of the D enclosure, a fingerprint sensor device, the foot and the brace 700 in the same space. A portion of the D enclosure can therefore be omitted or cut away, for example by way of creating the edge 704A in the enclosure 704, such that the enclosure 704 terminates before the side surface 706 of the enclosure 706A. That is, the portion of the D enclosure that is omitted or cut away is not visible in FIG. 7. The brace 700 can instead provide a surface for supporting the cosmetic component 702.

The brace 700 can have any suitable shape. In some implementations, the brace 700 includes (or can be) a longitudinal member. For example, the longitudinal member can have a cross section that is L-shaped (as shown in FIG. 7). The above examples illustrate that the brace 700 can serve for extending along the edge-to-edge opening in which an edge-to-edge component is mounted, and for strengthening and stiffening the enclosure at the edge-to-edge opening.

Figure 8:
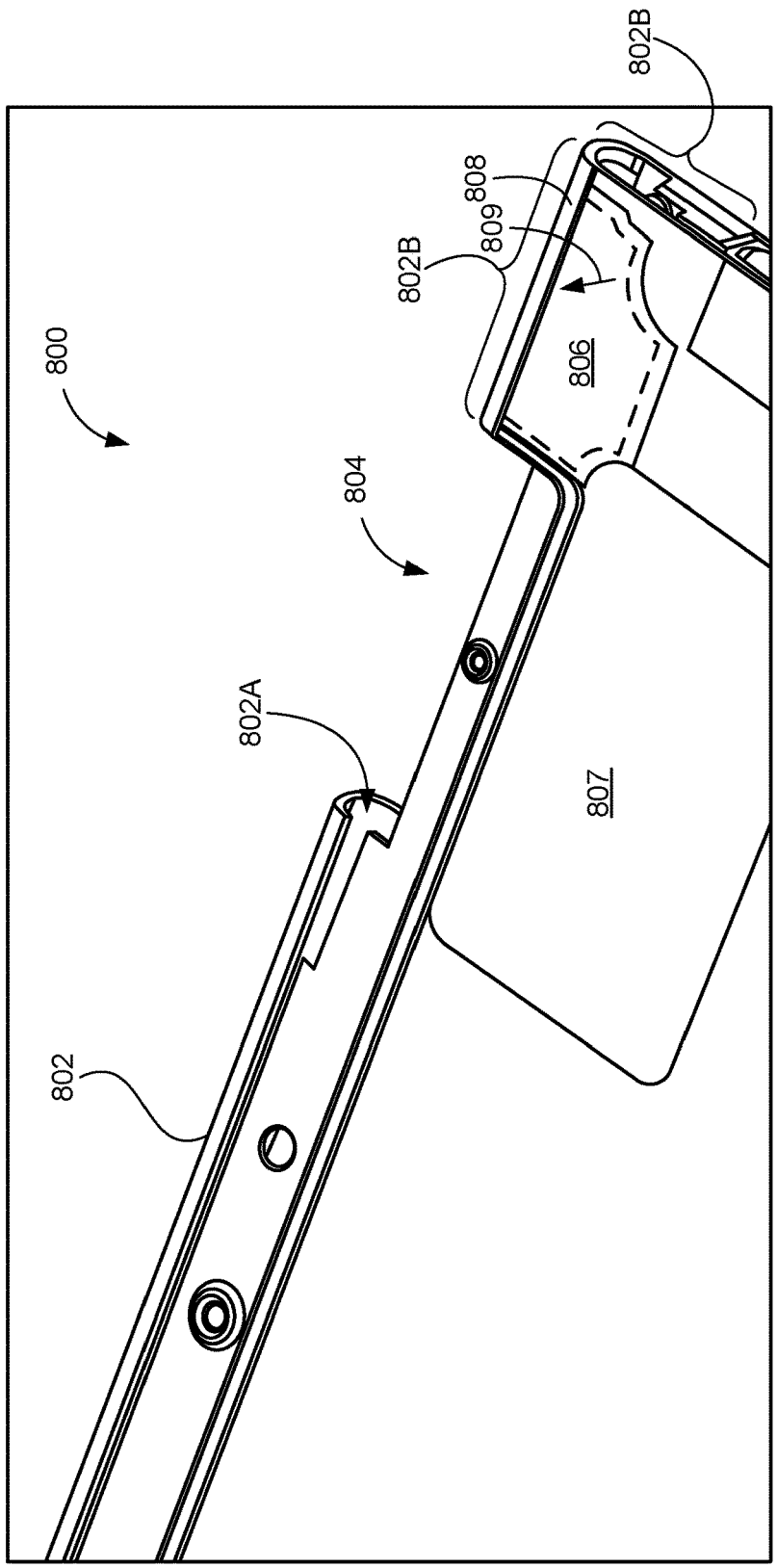
FIG. 8 shows an example of an electronic device having an enclosure with a curved undercut.

FIG. 8 shows an example of an electronic device 800 having an enclosure 802 with a curved undercut 802A. The enclosure 802 here has a particular architecture driven by the presence of an opening 804. For example, the opening can facilitate placement of a hinge that connects the enclosure 802 to another body portion of the electronic device 800. For example, cables may need to enter the enclosure 802 at the opening 804 and be accommodated by the curved undercut 802A (e.g., cables may be disposed in a cavity defined by the curved undercut 802A) as they extend toward circuitry inside the enclosure 802 (e.g., to a motherboard and base assembly). A corner 802B of the enclosure 802 to the right of the opening 804 in FIG. 8 may benefit from extra reinforcement. As another example, a corresponding corner (not shown) on the other side of the electronic device 800 from the corner 802B (i.e., toward the left side in FIG. 8) may benefit from extra reinforcement. As such, a support component 806 (only the outline is shown) can be added and disposed in the enclosure 802 that can help prevent that a portion 807 (e.g., a top portion) of the enclosure 802 lifts away from a base portion of the enclosure 802 and/or from a side surface 808 of the enclosure 802, for example in the event the electronic device is dropped. An arrow 809 here schematically indicates a possible lifting of the portion 807 that the support component 806 can help prevent. The support component 806 can have a portion coupled to a bottom of the portion 807 (e.g., C side of the base enclosure) and a second portion coupled to the curved undercut 802A. The curved undercut 802A here forms the side surface 808 of the electronic device 800. The support component 806 can provide strength and stiffness between the side surface 808 and the rest of the enclosure 802, such as the portion 807, for example by bridging between them. As another example, a support component (not shown) can also or instead be provided at the corresponding corner (not shown) on the other side of the electronic device 800 from the corner 802B (i.e., toward the left side in FIG. 8).

Figure 9:
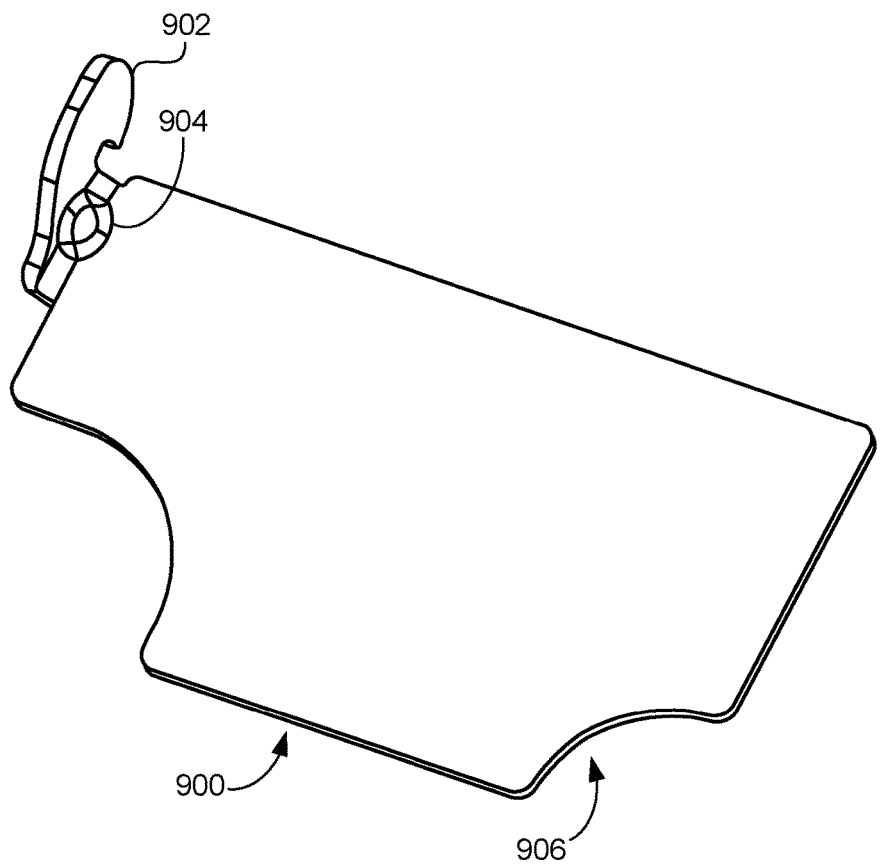
FIG. 9 shows an example of a support component with a curved hook.

FIG. 9 shows an example of a support component 900 with a curved hook 902. The curved hook 902 can be configured to be secured under an overhang of a base enclosure (e.g., an overhang 1004A formed by a curved undercut 1004 in FIG. 10), for example to prevent the enclosure from lifting away from the base enclosure. The support component 900 can be attached to the enclosure(s) using any suitable technique, including, but not limited to, by adhesive or by welding. In some implementations, the support component 900 is stamped from a metal material, as a single piece, and the curved hook 902 is a section of the stamped piece that is provided into the curved hook 902 by folding of the stamped blank to be perpendicular to (e.g., essentially perpendicular to) a remainder of the support component 900. The curved hook 902 is curved so as to fit within a curved undercut (e.g., the curved undercut 802A in FIG. 8 or the curved undercut 1004 in FIG. 10). One or more features 904 (e.g., a bump or a dimple) can be provided in the support component 900. For example, the feature 904 can prevent against bending of the curved hook 902 relative to the rest of the support component 900. The support component 900 can have one or more cutouts 906 for component(s) positioned nearby the support component 900 in the electronic device.

Figure 10:
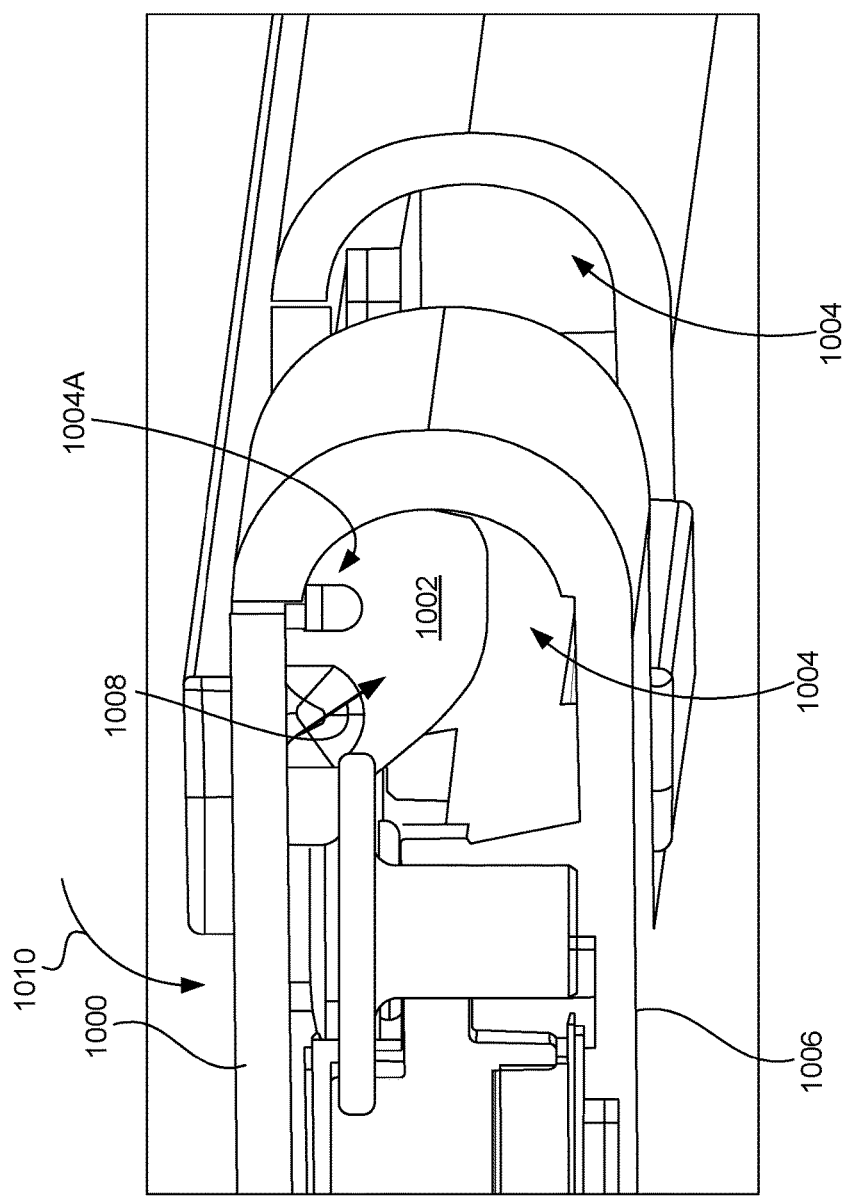
FIG. 10 shows an example of a support component with a curved hook extending into a curved undercut.

FIG. 10 shows an example of a support component 1000 with a curved hook 1002 extending into a curved undercut 1004. The curved undercut 1004 is formed in an enclosure 1006 of an electronic device. The curved undercut 1004 here forms an overhang 1004A. For example, the curved undercut 1004 can form a side surface of the enclosure 1006, between respective top and bottom surfaces thereof. The curved hook 1002 is configured to extend into the curved undercut 1004 so as to secure the support component 1000 in position. For example, during assembly the support component 1000 can be angled to insert the curved hook 1002 into the curved undercut 1004, as indicated by an arrow 1008, and then the support component can be rotated down into place on the enclosure 1006, as indicated by an arrow 1010. The curved hook 1002 can get positive engagement with the curved undercut 1004 after it is toed into, and engages with, the curved undercut 1004. As such, the support component 1000 can be held in place and provide strength and stiffness to the enclosure 1006.

Figure 12:
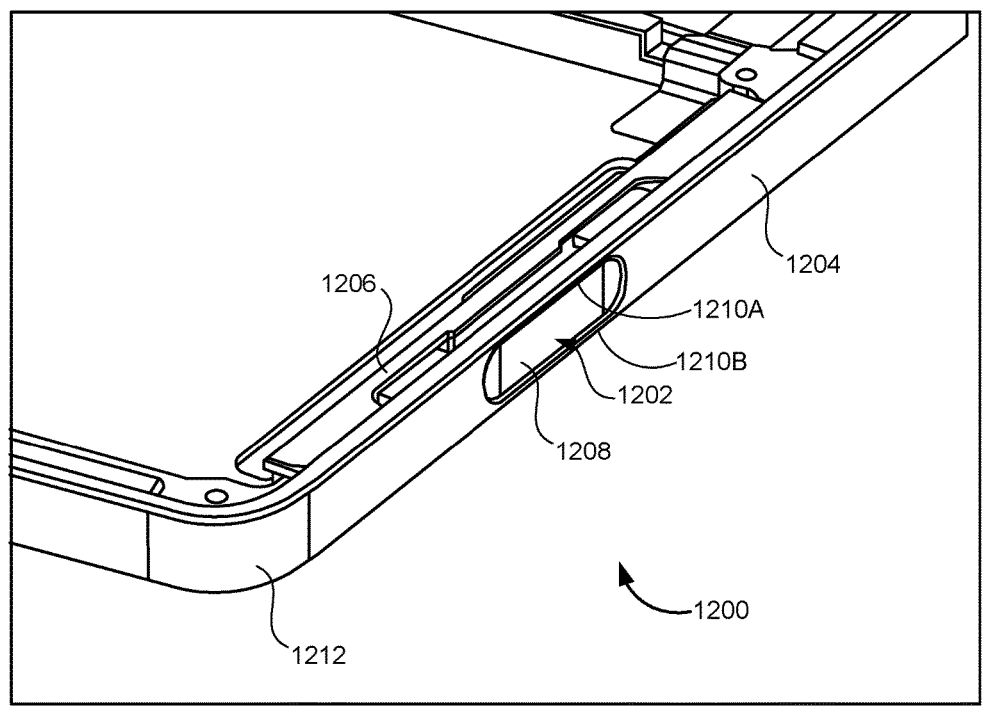
FIG. 12 shows an example of an electronic device with an edge-to-edge opening in an enclosure.

FIG. 12 shows an example of an electronic device 1200 with an edge-to-edge opening 1202 in an enclosure 1204. The enclosure 1204 can be, for example, the base of a laptop that also has a lid (not shown) hinged to the base. Only a portion of the enclosure 1204 is shown here for clarity. Also, for illustrative purposes, a portion that covers the interior of the enclosure 1204 (e.g., a C case) has been omitted. A brace 1206 is disposed inside the enclosure, and one or more edge-to-edge components 1208 (e.g., a fingerprint sensor device and/or a power button) can be mounted in the edge-to-edge opening 1202. For example, the brace 1206 can serve for extending along the edge-to-edge opening 1202 and for strengthening and stiffening the enclosure 1204 at the edge-to-edge opening 1202. In some implementations, the brace 1206 can be similar or identical to any other brace described or shown herein. In some implementations, the edge-to-edge component 1208 can be similar or identical to any other edge-to-edge component described or shown herein.

In some implementations, the edge-to-edge component 1208 can be an enclosed device, including, but not limited to, an enclosed fingerprint sensor device. Wall sections 1210A-B above and/or below the edge-to-edge component 1208 in the enclosure 1204 can be very thin. For example, this implementation can be used in a laptop having a thin form factor (including, but not limited to, a thickness of about, for example, 5 mm from the bottom to the top of the enclosure 1204). In some implementations, the wall sections 1210A-B can represent about, for example, 20-25% of the overall thickness of the enclosure 1204. The wall section 1210A and/or 1210B can be on the order of less than about, for example, 0.7 mm wide, including but not limited to, about, for example, 0.4 mm wide in some areas thereof. As such, the edge-to-edge opening 1202 can constitute a substantial cutout in the enclosure 1204, and the brace 1206 can provide strength and/or stiffness therefor, including, but not limited to, with regard to the wall sections 1210A-B. For example, the brace 1206 can provide advantageous strengthening/stiffening of a corner 1212 of the enclosure 1204, in that the corner 1212 can be considered a sensitive area in case the electronic device 1200 is dropped.

Figure 11:
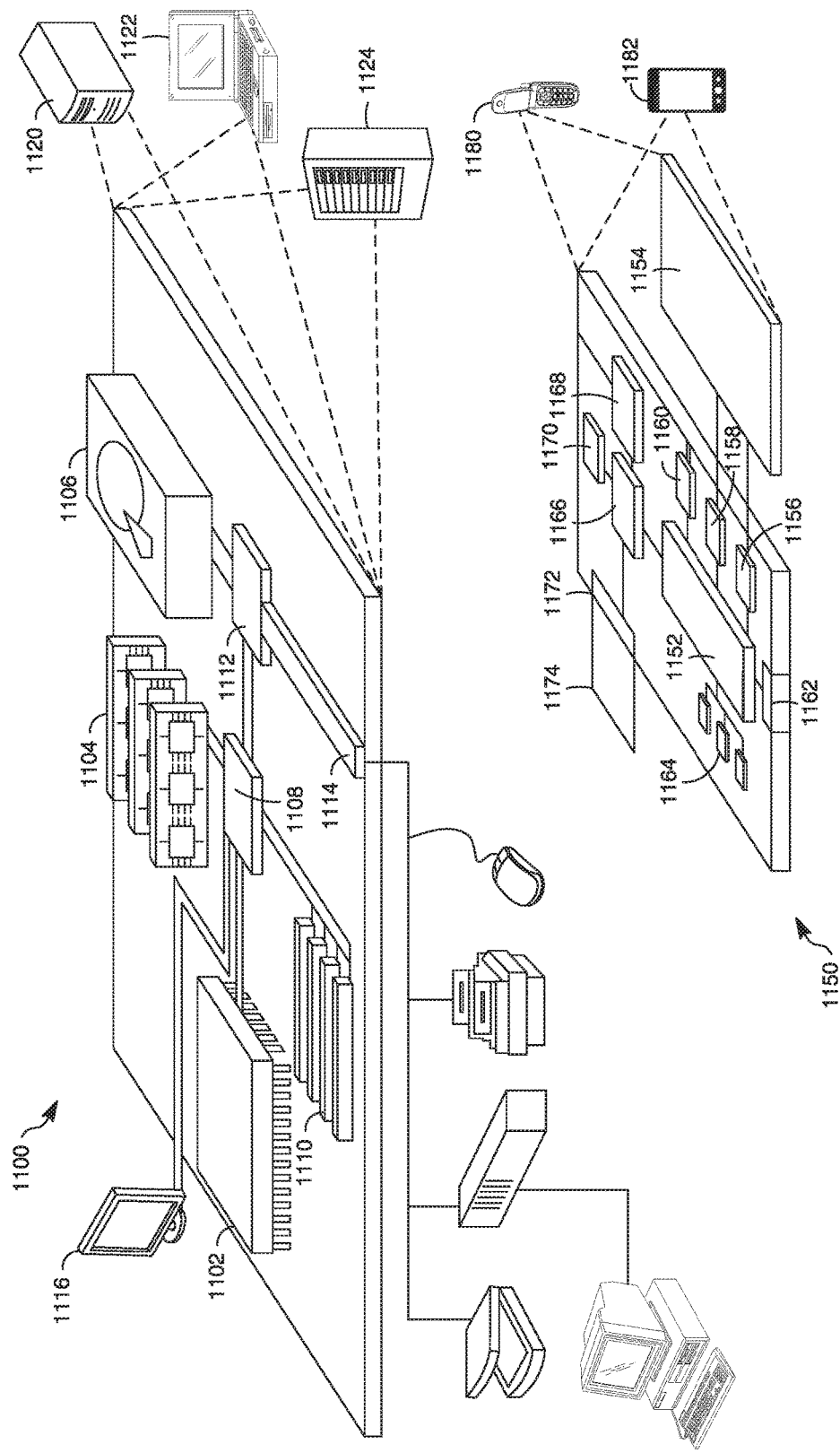
FIG. 11 shows an example of a computer device and a mobile computer device that can be used to implement the techniques described here.

FIG. 11 shows an example of a generic computer device 1100 and a generic mobile computer device 1150, which may be used with the techniques described here. Computing device 1100 is intended to represent various forms of digital computers, such as laptops, desktops, tablets, workstations, personal digital assistants, televisions, servers, blade servers, mainframes, and other appropriate computing devices. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. The processor 1102 can be a semiconductor-based processor. The memory 1104 can be a semiconductor-based memory. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provided in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provided as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An electronic device comprising:
   an enclosure having a first surface, a second surface, and a side surface disposed between the first surface and the second surface, wherein the enclosure comprises a base and a lid hinged to each other, the lid having a display and the base having a keyboard, wherein the electronic device can be moved to at least a first folded configuration in which the display is adjacent the keyboard, and a second folded configuration in which a back of the lid is adjacent a back of the base;
   an edge-to-edge component mounted in an edge-to-edge opening that extends across substantially an entire height of the side surface between the first surface and the second surface;
   a brace disposed inside the enclosure, the brace extending along the edge-to-edge opening;
   an antenna for the electronic device, the antenna mounted inside the lid; and
   an antenna window formed in the base, the antenna window configured to allow passage of signals to and from the antenna at least when the electronic device is in the second folded configuration.

2. The electronic device of claim 1, wherein the edge-to-edge component includes a fingerprint sensor device for the electronic device.

3. The electronic device of claim 2, wherein the fingerprint sensor device is configured to operate without a grounding ring being part of the edge-to-edge component.

4. The electronic device of claim 3, wherein a fingerprint sensor of the fingerprint sensor device is covered by a coating, and wherein the enclosure includes metal.

5. The electronic device of claim 1, wherein the edge-to-edge component includes a power button for the electronic device, the power button having a direction of travel directed through the edge-to-edge opening.

6. The electronic device of claim 5, wherein the brace serves as a bottoming-out structure for the power button.

7. The electronic device of claim 5, further comprising at least one biasing element mounted between the brace and the power button.

8. The electronic device of claim 1, wherein the brace comprises a longitudinal member having a length, wherein in at least part of the length the longitudinal member has an L-shaped profile.

9. The electronic device of claim 1, further comprising a cosmetic component supported by the brace.

10. The electronic device of claim 9, further comprising an enclosure portion extending along the first surface of the enclosure, wherein the cosmetic component is positioned on the enclosure portion, wherein the enclosure portion terminates before the side surface adjacent the edge-to-edge opening, and wherein the brace supports the cosmetic component between an edge of the enclosure portion and the side surface.

11. The electronic device of claim 1, wherein the enclosure includes at least a first enclosure having the first surface thereon, and a second enclosure having the second surface thereon, the first enclosure having a curved undercut forming the side surface, the electronic device further comprising a support component configured to bridge between the second enclosure and the side surface, the support component having a curved hook configured to extend into the curved undercut so as to secure the support component in position.

12. The electronic device of claim 11, wherein the support component comprises a stamped piece and wherein the curved hook is a section of the stamped piece folded so as to be essentially perpendicular to a remainder of the stamped piece.

13. The electronic device of claim 1, wherein the antenna window comprises an opening in a surface of the enclosure in the base, and wherein the brace is positioned adjacent the opening.

14. The electronic device of claim 1, wherein the edge-to-edge opening extends into at least one of the first and second surfaces.

15. The electronic device of claim 1, further comprising a flex conductor connected to the edge-to-edge component, the flex conductor extending along the brace, wherein the flex conductor includes a first fold of the flex conductor at an angle of about 45 degrees.

16. The electronic device of claim 15, wherein the enclosure includes at least a first enclosure having the first surface thereon, and a second enclosure having the second surface thereon, the first enclosure having a curved undercut forming the side surface, the electronic device further comprising a support component configured to bridge between the second enclosure and the side surface, the support component having a curved hook configured to extend into the curved undercut so as to secure the support component in position.

17. An electronic device comprising:
an enclosure having a first surface, a second surface, and a side surface disposed between the first surface and the second surface;
an edge-to-edge component mounted in an edge-to-edge opening that extends across substantially an entire height of the side surface between the first surface and the second surface;
a brace disposed inside the enclosure, the brace extending along the edge-to-edge opening; and
a flex conductor connected to the edge-to-edge component, the flex conductor extending along the brace, wherein the flex conductor extending along the brace includes a first fold of the flex conductor at an angle of about 45 degrees.

18. The electronic device of claim 17, further comprising a second fold of the flex conductor at an angle of about 90 degrees, wherein the flex conductor extends toward the edge-to-edge component through an opening or recess in the brace.

19. An electronic device comprising:
an enclosure having a first surface, a second surface, and a side surface disposed between the first and second surfaces;
an edge-to-edge component mounted in an edge-to-edge opening that extends across substantially an entire height of the side surface between the first surface and the second surface;
a brace inside the enclosure, the brace extending along the edge-to-edge opening and strengthening and stiffening the enclosure at the edge-to-edge opening; and
a cosmetic component supported by the brace;
wherein an enclosure portion extends along the first surface of the enclosure, wherein the cosmetic component is positioned on the enclosure portion, wherein the enclosure portion terminates before the side surface adjacent the edge-to-edge opening, and wherein the brace supports the cosmetic component between an edge of the enclosure portion and the side surface.

20. The electronic device of claim 19, wherein the enclosure comprises a base and a lid hinged to each other, the lid having a display and the base having a keyboard, wherein the electronic device can be moved to at least a first folded configuration in which the display is adjacent the keyboard, and a second folded configuration in which a back of the lid is adjacent a back of the base, the enclosure further comprising:
an antenna mounted inside the lid, and an antenna window formed in the base, the antenna window configured to allow passage of signals to and from the antenna at least when the electronic device is in the second folded configuration.

21. The electronic device of claim 19, further comprising a flex conductor connected to the edge-to-edge component, the flex conductor extending along the brace, wherein the flex conductor includes a first fold of the flex conductor at an angle of about 45 degrees.

* * * * *